3 Sheets—Sheet 1.
W. G. BARNES.
HORSE HAY-RAKES.
No. 195,328. Patented Sept. 18, 1877.
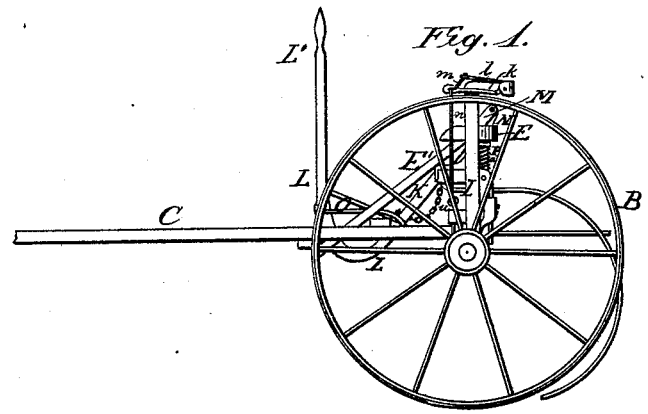
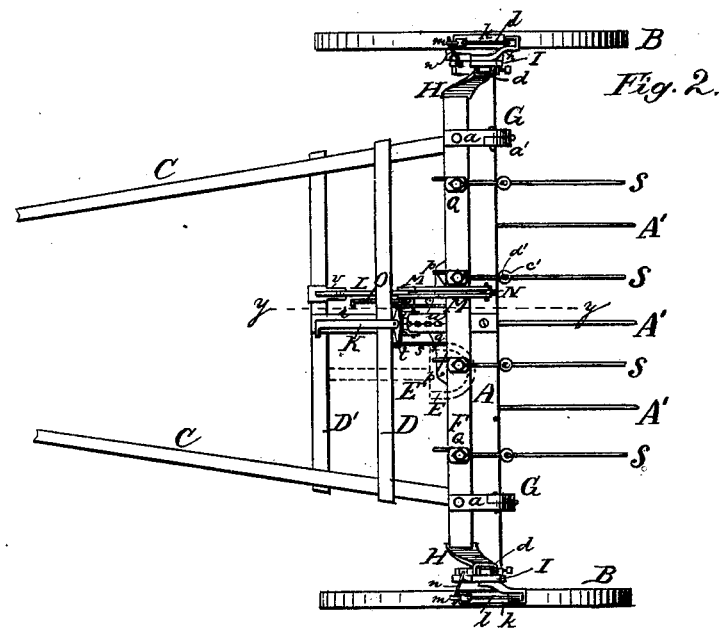
Attest:
Jno. P. Brooks.
August Petersohn
Inventor:
Walter G. Barnes
by Louis Bagger & Co.
attys.
N. PETERS, PHOTO-LITHOGRAPHER, WASHINGTON, D. C.

W. G. BARNES.
HORSE HAY-RAKES.

No. 195,328. Patented Sept. 18, 1877.

Attest: Jno. P. Brooks, August Petersohn.

Inventor: Walter G. Barnes, by Louis Bagger & Co. Attys.

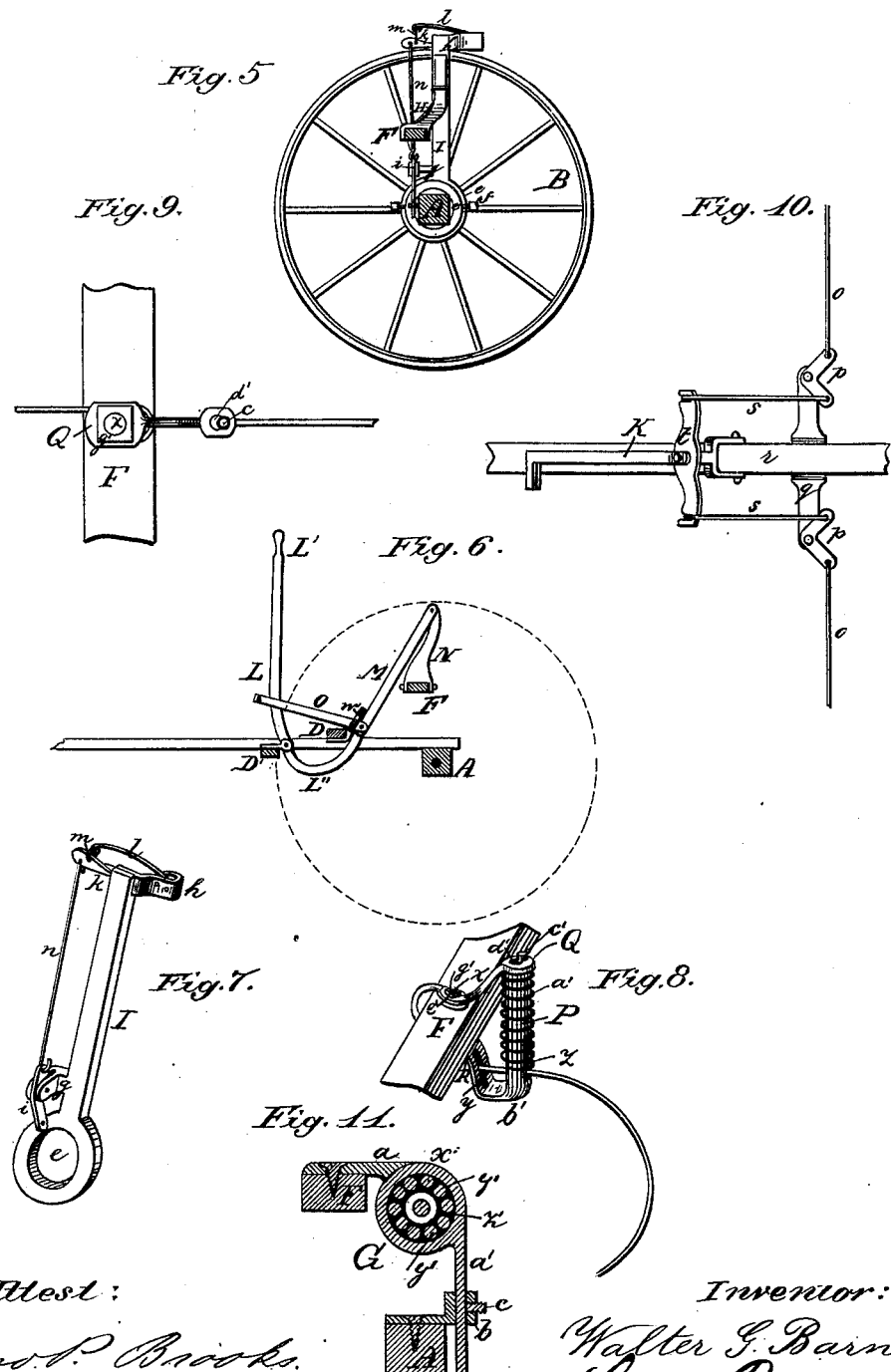

UNITED STATES PATENT OFFICE.

WALTER G. BARNES, OF FREEPORT, ILLINOIS.

IMPROVEMENT IN HORSE HAY-RAKES.

Specification forming part of Letters Patent No. 195,328, dated September 18, 1877; application filed June 4, 1877.

*To all whom it may concern:*

Be it known that I, WALTER G. BARNES, of Freeport, in the county of Stephenson and State of Illinois, have invented certain new and useful Improvements in Horse Hay-Rakes; and I do hereby declare that the following is a full, clear, and exact description thereof, which will enable others skilled in the art to which it appertains to make and use the same, reference being had to the accompanying drawings, which form a part of this specification, and in which—

Figure 3:
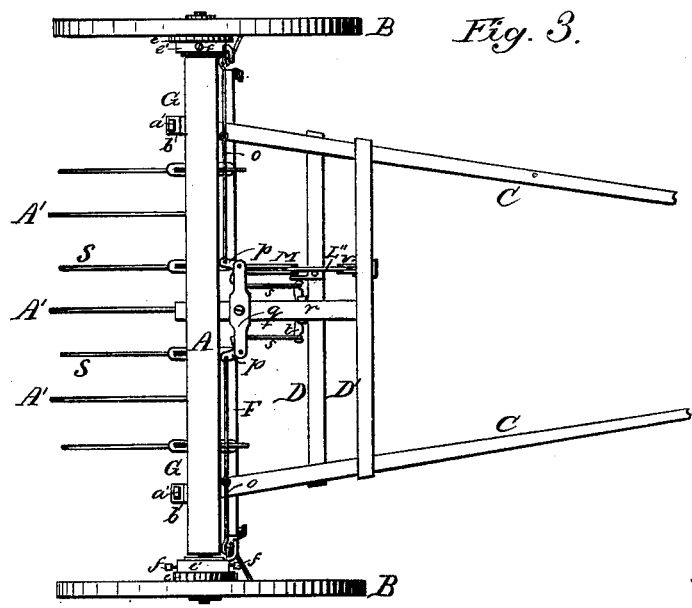
Figure 4:
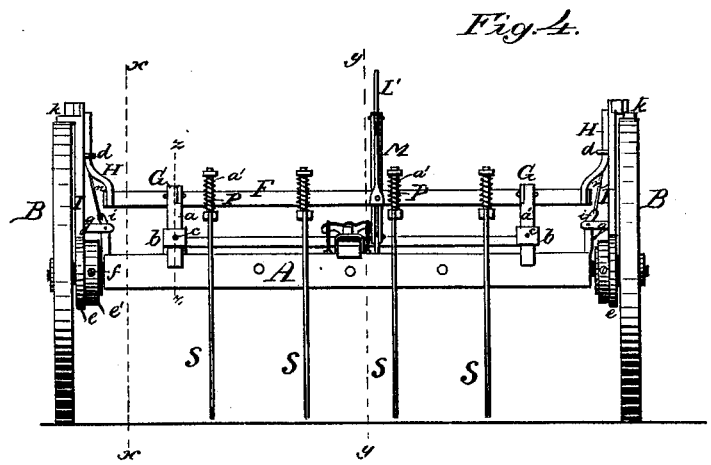

Figure 1 is a side elevation. Fig. 2 is a top plan. Fig. 3 is a bottom plan. Fig. 4 is a rear elevation. Fig. 5 is a vertical section on the line indicated by $xx$ in Fig. 4. Fig. 6 is a similar section on the line $yy$, Figs. 2 and 4. Fig. 7 is a perspective view of the brake lever and shoe detached from the machine. Fig. 8 is a perspective view of one of the rake-teeth, with its spring and the device for securing it upon the rake-head. Fig. 9 is a top view of a section of the rake-head on an enlarged sacle, showing the cap for securing the rake tooth and bolt in position on the head. Fig. 10 is a perspective view of the foot-lever and equalizer for operating the brakes, and Fig. 11 is a vertical section through one of the anti-friction hinges by which the rake-head is hung upon the axle.

Similar letters of reference indicate corresponding parts in all the figures.

My invention relates to that class of sulky-rakes in which the rake-head carrying the teeth may be raised for discharging the accumulated hay, either automatically by the advance of the machine, or by hand or foot power, at the option of the driver; and it consists in the construction, arrangement, and combination of parts; the object of which is to produce a sulky-rake that will do its work efficiently and satisfactorily under all conditions and circumstances, may be operated with ease whether used as a hand or self dumper, and yet be sufficiently simple in its construction to allow of its manufacture and sale at a figure that will place it within the reach of farmers and agriculturists generally.

In the drawings hereto annexed, A represents the axle. B B are the wheels, C C the thills or side bars, and D D' the cross-pieces uniting the latter in front of the axle. E is the driver's seat, and E' the seat-bar. F is the rake-head, which has bolted to it, at each end, one of the straps $a$ of an anti-friction hinge, G, the other strap, $a'$, of which is inserted vertically into a slotted casting, $b$, bolted or otherwise secured upon the rear end of each of the thills C, or, if preferred, upon the axle A. The straps $a'$ may be adjusted in any given position within the tubular castings $b$ by means of set-screws or pins $c$.

By this construction and combination of the rake-head and axle the weight of the rake-head is thrown forward of the hinging-point and axle, thereby in a measure balancing the weight of the teeth, and making it easier to raise the latter to discharge their load, and by loosening set-screws $cc$ the rake head and teeth may be so adjusted as to be a greater or lesser distance from the ground, so that teeth of different sizes may be used in the same machine by simply raising or lowering the rake-head in the manner described, to suit the circumstances.

The construction of the anti-friction hinges G is represented in the sectional view, Fig. 11, from which it will be seen that each of these hinges consists of two leaves or straps, $a$ $a'$, each of which has an enlarged circular head, $x'$, having an annular recess, $z'$, surrounding the central perforation for the pin, within which are placed the friction-rollers $y'$. This construction admits of the easy rotation of the head, which is a matter of great importance in self-dumping rakes, in which a satisfactory operation of the machine always depends upon the prompt restoration of the rake head and teeth to their operative position after the load has been dumped or discharged.

H H are levers hinged or bolted onto the ends or extremities of the hinged rake-head F, and passing upward through loops or keepers $d$ secured upon the inner sides of lever-arms I, one of which is secured loosely, by its eye $e$, upon each wheel, and prevented from moving laterally by a ring or tubular washer, $e'$, held firmly on the wheel by two set-screws, $f$. Each lever-arm I is cast or made with two brackets, $g$ $h$, projecting laterally at right angles to each other, the lowermost one of which, $g$, serves as a fulcrum for a bell-crank, $i$, while the upper, $h$, has hinged to it the horizontally-projecting brake-shoe $k$. Above shoe $k$, and parallel to it, is a spring, $l$, the forward end of which is united to the forward end of the shoe by a link or loop, $m$, in such a manner that the spring will raise the brake-shoe from the periphery of the wheel. $n$ is a rod, pivoted in the forward end of the hinged brake-shoe, and passing down to the bell-crank $i$, from the other end of which a chain or rod, $o$, passes, parallel to the axle A, to a horizontal bell-crank, $p$, which has its fulcrum in a bracket, $q$, secured upon the piece $r$. There are, of course, two chains or rods, $o$, and two bell-cranks, $p$, one for each braking device. The other ends of cranks $p$ are united, by short chains or rods $s\ s$, to a lever or equalizer, $t$, which has its fulcrum just above the forked part of the foot-lever K, which is pivoted to piece $r$ in front of the cross-arm or bracket $q$, which carries the bell-cranks $p\ p$, as more clearly shown in the enlarged view, Fig. 10. $u$ is a short chain, which passes from the treadle or foot-lever K back to the rake-head, to which it is secured, for the purpose of drawing the lever back into its normal position when the brakes are released and the teeth and rake-head fall back after discharging their load of hay.

From the foregoing description the operation of the mechanism for raising the rake head and teeth automatically by the advance of the machine and rotation of the wheels will be readily understood. When the driver places his foot on the treadle-lever K he will, by the combination of rods $s\ s$, bell-cranks $p\ p$, rods or chains $o\ o$, cranks $i\ i$, and vertical rods $n\ n$, pull down on the brake-shoes or friction-blocks $k\ k$, which are hinged to and project from the upper ends of lever-arms I I, thereby overcoming the tension of springs $l\ l$ and forcing the shoe down against the tire of the wheel. As this revolves it will, by the friction, carry shoe $k$ and lever I (which is hung loosely on the wheel) with it; and as the lever-arms H H engage with the rotating arms I I by means of the loops or keepers $d$, it follows that these will be partly rotated also, thereby lifting the rake-head with its teeth and disengaging the hay, which is retained and dropped by the clearers or fingers A', which project between the teeth in the usual manner. The moment the driver lets go the pressure on lever K the rake head and teeth will drop back by their own weight, and thereby instantly release the brakes, chain $u$ pulling lever K back into its former position, ready for a repetition of the operation.

Having in the foregoing described that part of my invention which relates to the mechanism for operating my improved sulky hay-rake as a self-dumper, I shall now proceed to describe the mechanism for operating it by hand or foot power. This consists of a cranked lever, L, having its fulcrum in a bearing, $v$, bolted onto the forward cross-piece D' of the sulky-frame, and having a handle, L', within easy reach of the driver. The short arm L'' of lever L is hinged to a rod, M, the other end of which is pivoted in the top of a standard or upright, N, bolted or screwed to the top of the rake-head F. O is a short arm, which is hinged at the point where lever L'' and rod M are pivoted together, and projects up through a slotted piece, $w$, secured upon cross-piece D. Arm O terminates in a bent piece or treadle, so as to be within easy reach of the driver's right foot, by which it is operated.

To raise the rake head and teeth, the lever L is pulled toward the driver's seat E, and by this operation arm or foot lever O will slide down through the slotted piece $w$, which serves as a guide. To lower the rake head and teeth, lever L is pushed in the opposite direction, which pushes arm O up through guide $w$, when it falls forward by its own weight, occupying the position shown in Fig. 6. When, arm O being in this position, the foot is placed firmly on its forward part or treadle, it is obvious that it will prevent the hay, as it accumulates under the rake, from raising the teeth, but will hold the rake head and teeth rigidly in their position until the driver lets go his hold on O, when the rake head and teeth may readily be raised, either by the self-dumping mechanism or by the hand-lever L, in the manner described.

Having already described the construction of the hinged and adjustable rake-head, and its combination with the axle, I shall now proceed to explain my improved tooth-holder, or device for securing the teeth upon the rake-head. This consists of two parts, viz., an upright slotted bolt or staple, P, bent at its lower slotted part, and a curved cap or catch piece, Q, both of which are represented, on an enlarged scale, in Figs. 8 and 9 on Sheet 3 of the drawings. The rake-teeth, which are preferably of the usual S shape, as shown on the drawings, are fitted around bolts $x$ on the top of the rake-head, then pass, by their upper curve, in front of this, under it, and forward through slots $y$ and $z$ in staple P. Coiled around the upper part of this staple, so as to impinge against the tooth, is a coiled spring, $a'$, the upper end of which impinges upon the cap-piece Q. By the solid section $b'$ of staple P, between the slots $y$ and $z$, spring $a'$ is prevented from forcing the tooth out of the slot $y$ in the upright portion of staple P, through which it passes.

The top of staple P terminates in a bent lug or catch, $c'$, which operates as follows: After the teeth have been secured upon the rake-head and inserted through slots $y$ and $z$, the lower curved portion R of staple P is screwed or bolted onto the under side of the rake-head. The coiled spring $a'$ is then slipped over the staple, compressed, and the opening $d'$ in cap Q is inserted over hook $c'$, turned round so as to catch in under the bent lug, and the opposite perforation $e'$ is slipped over bolt $x$ on top of the tooth, after which the nut $g'$ is screwed down, thus firmly securing both the tooth and the cap-piece in their places. By this construction lateral play of the teeth is effectually prevented, the coiled spring $a'$ gives elasticity to and strengthens the tooth, and the latter may readily be removed, when broken or damaged, by removing the catch or cap piece Q and the nut $g'$, without disturbing the staples.

Having thus described my invention, I claim and desire to secure by Letters Patent of the United States—

1. As an improvement in self-dumping horse hay-rakes, the combination of the axle A, having vertical levers I I, with the adjustable hinged rake-head F, having levers H H working in keepers $d\ d$ on levers I I, so as to be turned when the axle with its levers is rotated, substantially as and for the purpose herein shown and specified.

2. The combination of the hinged and adjustable rake-head F, having upright levers H H, with the axle A, wheels B B, and brake-levers I I, carrying the hinged shoes $k\ k$, substantially as and for the purpose herein shown and specified.

3. The combination of the brake-levers I, hinged friction-blocks $k$, and springs $l$, substantially as and for the purpose herein shown and specified.

4. The combination of the levers I, hinged friction-blocks $k$, springs $l$, and operating mechanism consisting of rods $n\ o$, cranks $i\ p$, rods $s$, equalizer $t$, and foot-lever K, substantially as and for the purpose herein shown and described.

5. The tooth-holder herein shown and described, consisting of the bent and slotted bolt P R, in combination with the spring $a'$ and cap-piece Q, substantially as and for the purpose hereinbefore set forth.

6. The combination of the rake-head F, tooth S, curved bolt or staple P R, having slots $y\ z$, coiled spring $a'$, cap-piece Q, bolt $x$, and clamp-nut $g'$, substantially as and for the purpose hereinbefore set forth.

In testimony that I claim the foregoing as my own I have hereto affixed my signature in presence of two witnesses.

WALTER G. BARNES.

Witnesses:
WILLIAM BARNES,
RUDOLF HEFTIN.